(12) United States Patent
Savela

(10) Patent No.: US 10,436,064 B2
(45) Date of Patent: Oct. 8, 2019

(54) BOWED ROTOR START RESPONSE DAMPING SYSTEM

(71) Applicant: United Technologies Corporation, Farmington, CT (US)

(72) Inventor: Gregory M. Savela, Stuart, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 118 days.

(21) Appl. No.: 15/042,346

(22) Filed: Feb. 12, 2016

(65) Prior Publication Data

US 2017/0234158 A1    Aug. 17, 2017

(51) Int. Cl.
| | | |
|---|---|---|
| *F01D 25/16* | (2006.01) | |
| *F01D 19/00* | (2006.01) | |
| *F16F 15/023* | (2006.01) | |
| *F16C 27/04* | (2006.01) | |
| *F01D 5/02* | (2006.01) | |
| *F01D 15/12* | (2006.01) | |
| *F01D 19/02* | (2006.01) | |

(Continued)

(52) U.S. Cl.
CPC ........... *F01D 25/164* (2013.01); *F01D 5/027* (2013.01); *F01D 15/12* (2013.01); *F01D 19/00* (2013.01); *F01D 19/02* (2013.01); *F01D 25/18* (2013.01); *F02K 3/06* (2013.01); *F16C 27/045* (2013.01); *F16F 15/0237* (2013.01); *F05D 2220/32* (2013.01); *F05D 2240/53* (2013.01); *F05D 2240/60* (2013.01); *F05D 2260/98* (2013.01); *F05D 2270/02* (2013.01); *F05D 2270/114* (2013.01); *F05D 2270/304* (2013.01); *F16C 2360/23* (2013.01)

(58) Field of Classification Search
CPC ........ F01D 15/12; F01D 19/02; F01D 25/164; F01D 25/18; F01D 5/027; F02K 3/06; F05D 2220/32; F05D 2240/53; F05D 2240/60; F05D 2270/02; F05D 2270/114; F05D 2270/304
See application file for complete search history.

(56) References Cited

U.S. PATENT DOCUMENTS

| | | |
|---|---|---|
| 1,951,875 A | 3/1934 | Laabs |
| 2,617,253 A | 11/1952 | Fusner et al. |

(Continued)

FOREIGN PATENT DOCUMENTS

| | | |
|---|---|---|
| EP | 1396611 | 3/2004 |
| EP | 1533479 A2 | 5/2005 |

(Continued)

OTHER PUBLICATIONS

U.S. Appl. No. 15/042,331 Non-Final Office Action dated Sep. 9, 2016, 37 pages.

(Continued)

*Primary Examiner* — William M McCalister
(74) *Attorney, Agent, or Firm* — Cantor Colburn LLP

(57) ABSTRACT

A method of bowed rotor start response damping for a gas turbine engine is provided. A spring rate and a damping characteristic of one or more bearing supports in the gas turbine engine are selectively modified while a shaft of the gas turbine engine rotates below a speed which is adversely affected by a bowed rotor condition of the gas turbine engine.

20 Claims, 3 Drawing Sheets

(51) Int. Cl.
  *F01D 25/18* (2006.01)
  *F02K 3/06* (2006.01)

(56) References Cited

U.S. PATENT DOCUMENTS

| | | | |
|---|---|---|---|
| 2,962,597 A | 11/1960 | Evans | |
| 3,057,155 A | 10/1962 | Rizk | |
| 3,151,452 A | 10/1964 | Bunger et al. | |
| 3,290,709 A | 12/1966 | Whitenack, Jr. et al. | |
| 3,360,844 A | 1/1968 | Wonneman | |
| 3,764,815 A | 10/1973 | Habock et al. | |
| 3,793,905 A | 2/1974 | Black et al. | |
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,120,159 A | 10/1978 | Matsumoto et al. | |
| 4,144,421 A | 3/1979 | Sakai | |
| 4,302,813 A | 11/1981 | Kurihara et al. | |
| 4,353,604 A * | 10/1982 | Dulberger | F01D 25/164 |
| | | | 384/584 |
| 4,380,146 A | 4/1983 | Yannone et al. | |
| 4,426,641 A | 1/1984 | Kurihara et al. | |
| 4,435,770 A | 3/1984 | Shiohata et al. | |
| 4,437,163 A | 3/1984 | Kurihara et al. | |
| 4,453,407 A | 6/1984 | Sato et al. | |
| 4,485,678 A | 12/1984 | Fanuele | |
| 4,488,240 A | 12/1984 | Kapadia et al. | |
| 4,496,252 A * | 1/1985 | Horler | C23C 16/45504 |
| | | | 384/215 |
| 4,598,551 A | 7/1986 | Dimitroff, Jr. et al. | |
| 4,627,234 A | 12/1986 | Schuh | |
| 4,642,782 A | 2/1987 | Kemper et al. | |
| 4,669,893 A | 6/1987 | Chalaire et al. | |
| 4,713,985 A | 12/1987 | Ando | |
| 4,733,529 A | 3/1988 | Nelson et al. | |
| 4,747,270 A | 5/1988 | Klie et al. | |
| 4,854,120 A | 8/1989 | Nelson et al. | |
| 4,862,009 A | 8/1989 | King | |
| 4,979,362 A | 12/1990 | Vershure, Jr. | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,798,720 B1 | 9/2010 | Walsh | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,770,913 B1 | 7/2014 | Negron et al. | |
| 8,776,530 B2 | 7/2014 | Shirooni et al. | |
| 8,820,046 B2 | 9/2014 | Ross et al. | |
| 8,918,264 B2 | 12/2014 | Jegu et al. | |
| 9,086,018 B2 | 7/2015 | Winston et al. | |
| 9,121,309 B2 | 9/2015 | Geiger | |
| 9,429,510 B2 | 8/2016 | Belsom et al. | |
| 9,699,833 B2 | 7/2017 | Broughton et al. | |
| 9,845,730 B2 | 12/2017 | Betti et al. | |
| 9,988,928 B2 | 6/2018 | Popescu et al. | |
| 2002/0173897 A1 | 11/2002 | Leamy et al. | |
| 2003/0145603 A1 | 8/2003 | Reed et al. | |
| 2004/0065091 A1 | 4/2004 | Anderson | |
| 2004/0131138 A1 | 7/2004 | Correia et al. | |
| 2006/0032234 A1 | 2/2006 | Thompson | |
| 2006/0188372 A1 | 8/2006 | Hansen | |
| 2006/0260323 A1 | 11/2006 | Moulebhar | |
| 2007/0031249 A1 | 2/2007 | Jones | |
| 2007/0151258 A1 | 7/2007 | Gaines et al. | |
| 2008/0072568 A1 | 3/2008 | Moniz et al. | |
| 2009/0246018 A1 * | 10/2009 | Kondo | F01D 25/164 |
| | | | 415/229 |
| 2009/0301053 A1 | 12/2009 | Geiger | |
| 2009/0314002 A1 | 12/2009 | Libera et al. | |
| 2010/0095791 A1 | 4/2010 | Galloway | |
| 2010/0132365 A1 | 6/2010 | Labala | |
| 2010/0293961 A1 | 11/2010 | Tong et al. | |
| 2010/0326085 A1 | 12/2010 | Veilleux | |
| 2011/0077783 A1 | 3/2011 | Karpman et al. | |
| 2011/0146276 A1 | 6/2011 | Sathyanarayana et al. | |
| 2011/0153295 A1 | 6/2011 | Yerramalla et al. | |
| 2011/0296843 A1 | 12/2011 | Lawson, Jr. | |
| 2011/0308345 A1 | 12/2011 | Makulec et al. | |
| 2012/0031067 A1 | 2/2012 | Sundaram et al. | |
| 2012/0240591 A1 | 9/2012 | Snider et al. | |
| 2012/0266601 A1 | 10/2012 | Miller | |
| 2012/0316748 A1 | 12/2012 | Jegu et al. | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0134719 A1 | 5/2013 | Watanabe et al. | |
| 2013/0251501 A1 | 9/2013 | Araki et al. | |
| 2014/0060076 A1 | 3/2014 | Cortelli et al. | |
| 2014/0123673 A1 | 5/2014 | Mouze et al. | |
| 2014/0199157 A1 | 7/2014 | Haerms et al. | |
| 2014/0236451 A1 | 8/2014 | Gerez et al. | |
| 2014/0241878 A1 | 8/2014 | Herrig et al. | |
| 2014/0271152 A1 | 9/2014 | Rodriguez | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373552 A1 | 12/2014 | Zaccaria et al. | |
| 2014/0373553 A1 | 12/2014 | Zaccaria et al. | |
| 2014/0373554 A1 | 12/2014 | Pech et al. | |
| 2015/0016949 A1 | 1/2015 | Smith | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2015/0219121 A1 * | 8/2015 | King | F16B 43/00 |
| | | | 415/119 |
| 2015/0377141 A1 | 12/2015 | Foiret | |
| 2016/0236369 A1 | 8/2016 | Baker | |
| 2016/0245312 A1 | 8/2016 | Morice | |
| 2016/0265387 A1 * | 9/2016 | Duong | F01D 25/16 |
| 2016/0288325 A1 | 10/2016 | Naderer et al. | |
| 2017/0030265 A1 | 2/2017 | O'Toole et al. | |
| 2017/0218848 A1 | 8/2017 | Alstad et al. | |
| 2017/0233103 A1 | 8/2017 | Teicholz et al. | |
| 2017/0234166 A1 | 8/2017 | Dube et al. | |
| 2017/0234167 A1 | 8/2017 | Stachowiak et al. | |
| 2017/0234230 A1 | 8/2017 | Schwarz et al. | |
| 2017/0234231 A1 | 8/2017 | Virtue, Jr. et al. | |
| 2017/0234232 A1 | 8/2017 | Sheridan et al. | |
| 2017/0234233 A1 | 8/2017 | Schwarz et al. | |
| 2017/0234235 A1 | 8/2017 | Pech | |
| 2017/0234236 A1 | 8/2017 | Feulner et al. | |
| 2017/0234238 A1 | 8/2017 | Schwarz et al. | |
| 2018/0010480 A1 | 1/2018 | Hockaday et al. | |

(56) References Cited

U.S. PATENT DOCUMENTS

| | | |
|---|---|---|
| 2018/0265223 A1 | 9/2018 | Teicholz et al. |
| 2018/0274390 A1 | 9/2018 | Clauson et al. |
| 2018/0327117 A1 | 11/2018 | Teicholz et al. |

FOREIGN PATENT DOCUMENTS

| | | |
|---|---|---|
| EP | 1862875 | 12/2007 |
| EP | 2006496 | 12/2008 |
| EP | 2305986 | 4/2011 |
| EP | 2363575 A2 | 9/2011 |
| EP | 2871333 | 5/2015 |
| EP | 3051074 | 8/2016 |
| FR | 2933131 | 1/2010 |
| GB | 1374810 | 11/1974 |
| GB | 2117842 | 10/1983 |
| GB | 2218751 | 11/1989 |
| IN | 201408865 | 5/2015 |
| JP | 2002371806 | 12/2002 |
| JP | 2004036414 | 2/2004 |
| WO | 9900585 | 1/1999 |
| WO | 2013007912 | 1/2013 |
| WO | 2014152701 | 9/2014 |
| WO | 2015030946 | 3/2015 |
| WO | 2016069303 | 5/2016 |

OTHER PUBLICATIONS

EP Application No. 17155584 Extended European Search Report dated Jul. 6, 2017, 9 pages.
EP Application No. 17155601 Extended European Search Report dated Jun. 30, 2017, 7 pages.
EP Application No. 17155612 Extended European Search Report dated Jul. 4, 2017, 8 pages.
EP Application No. 17155613 Extended European Search Report dated Jun. 27, 2017, 10 pages.
EP Application No. 17155683 Extended European Search Report dated Jun. 30, 2017, 8 pages.
EP Application No. 17155687 Extended European Search Report dated Jun. 16, 2017, 9 pages.
EP Application No. 17155698 Extended European Search Report dated Jun. 21, 2017, 9 pages.
EP Application No. 17155721 Extended European Search Report dated Jun. 27, 2017, 8 pages.
EP Application No. 17155793 Extended European Search Report dated Jun. 30, 2017, 10 pages.
EP Application No. 17155798 Extended European Search Report dated Jun. 30, 2017, 9 pages.
EP Application No. 17155807 Extended European Search Report dated Jul. 3, 2017, 8 pages.
Extended European Search Report for Application No. 17179407.6-1610 dated Dec. 5, 2017 (8 pp.).
EP Application No. 17155683 Office Action dated May 22, 2018, 2 pages.
EP Application No. 17155612.9 Office Action dated Oct. 2, 2018, 3 pages.
EP Application No. 17155698.8 Office Action dated Sep. 27, 2018, 3 pages.
EP Application No. 17155798.6 Office Action dated Sep. 21, 2018, 3 pages.

* cited by examiner

BOWED ROTOR START RESPONSE DAMPING SYSTEM

BACKGROUND

This disclosure relates to gas turbine engines, and more particularly to a bowed rotor start response damping system.

Gas turbine engines are used in numerous applications, one of which is for providing thrust to an aircraft. When a gas turbine engine of an aircraft has been shut off for example, after an aircraft has landed at an airport, the engine is hot and due to heat rise, the upper portions of the engine will be hotter than lower portions of the engine. When this occurs thermal expansion may cause deflection of components of the engine which may result in a "bowed rotor" condition. When starting an engine with a "bowed rotor" condition, a resulting significant rotational imbalance can excite fundamental modes of components of the engine. This in turn produces excessive deflections of the engine rotor, while bowing of the engine case can result in a reduction in normal build clearances and thus results in a potential for rubbing between the rotating turbomachinery and the closed-down case structure. The rub condition can result in a hung start or a performance loss in the turbomachinery.

Accordingly, it is desirable to provide a method and/or apparatus for damping a "bowed rotor" upon engine start.

BRIEF DESCRIPTION

In one embodiment, a method of bowed rotor start response damping for a gas turbine engine is provided. A spring rate and a damping characteristic of one or more bearing supports in the gas turbine engine are selectively modified while a shaft of the gas turbine engine rotates below a speed which is adversely affected by a bowed rotor condition of the gas turbine engine.

In addition to one or more of the features described above, or as an alternative to any of the foregoing embodiments, further embodiments may include where selectively modifying the spring rate and the damping characteristic of the one or more bearing supports is performed while the shaft of the gas turbine engine rotates through a resonant frequency of the shaft.

In addition to one or more of the features described above, or as an alternative to any of the foregoing embodiments, further embodiments may include where the gas turbine engine is a turbofan with a straddle mounted starting spool.

In addition to one or more of the features described above, or as an alternative to any of the foregoing embodiments, further embodiments may include where the gas turbine engine is a turbofan.

In addition to one or more of the features described above, or as an alternative to any of the foregoing embodiments, further embodiments may include where selectively modifying the spring rate and the damping characteristic of the one or more bearing supports is performed based on detecting a start indication of the gas turbine engine.

In addition to one or more of the features described above, or as an alternative to any of the foregoing embodiments, further embodiments may include where selectively modifying the spring rate and the damping characteristic of the one or more bearing supports further includes opening a control valve to urge pressurized oil into a damper of at least one of the one or more bearing supports based on the start indication.

In addition to one or more of the features described above, or as an alternative to any of the foregoing embodiments, further embodiments may include selectively closing the control valve to accumulate the pressurized oil.

In another embodiment, a bowed rotor start response damping system for a gas turbine engine is provided. The bowed rotor start response damping system includes an oil supply circuit operable to selectively modify a spring rate and a damping characteristic of one or more bearing supports in the gas turbine engine while a shaft of the gas turbine engine rotates below a speed which is adversely affected by a bowed rotor condition of the gas turbine engine.

In another embodiment, a gas turbine engine includes one or more bearing supports, a shaft supported by one or more bearings of the one or more bearing supports, and an oil supply circuit operable to selectively modify a spring rate and a damping characteristic of the one or more bearing supports while the shaft rotates below a speed which is adversely affected by a bowed rotor condition of the gas turbine engine.

In addition to one or more of the features described above, or as an alternative to any of the foregoing embodiments, further embodiments may include where selective modification of the spring rate and the damping characteristic of the one or more bearing supports is performed while the shaft of the gas turbine engine rotates through a resonant frequency of the shaft.

In addition to one or more of the features described above, or as an alternative to any of the foregoing embodiments, further embodiments may include where the gas turbine engine is a geared turbofan.

In addition to one or more of the features described above, or as an alternative to any of the foregoing embodiments, further embodiments may include where selective modification of the spring rate and the damping characteristic of the one or more bearing supports are performed based on detecting a start indication of the gas turbine engine.

In addition to one or more of the features described above, or as an alternative to any of the foregoing embodiments, further embodiments may include a control valve, where selective modification of the spring rate and the damping characteristic of the one or more bearing supports further includes opening the control valve to urge pressurized oil into a damper of at least one of the one or more bearing supports based on the start indication.

In addition to one or more of the features described above, or as an alternative to any of the foregoing embodiments, further embodiments may include where the control valve is selectively closed to accumulate the pressurized oil.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

Figure 1:
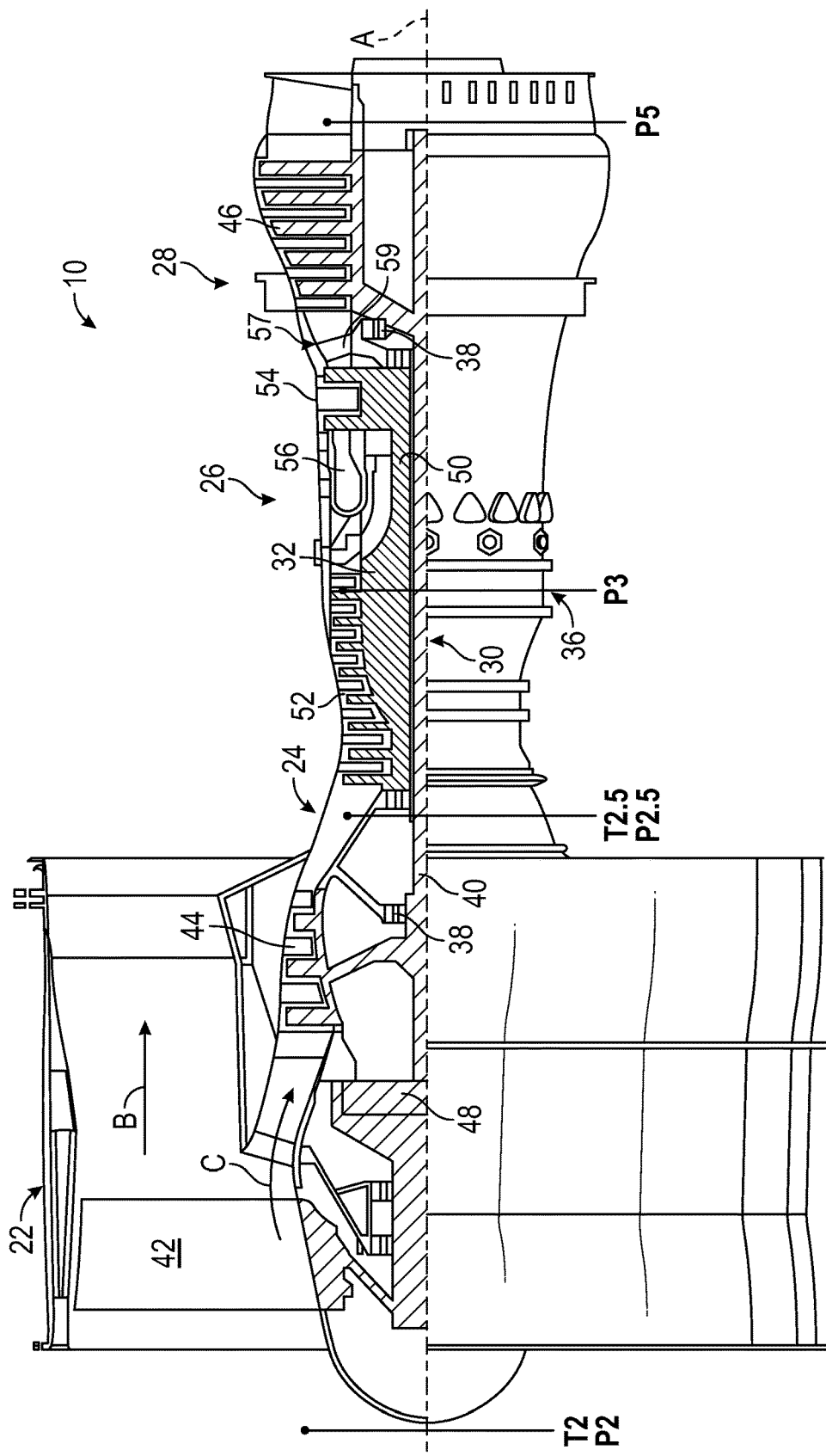
FIG. 1 is a cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to a bowed rotor start response damping system in a gas turbine engine. To assist in minimizing a bowed rotor start response, a gas turbine engine employs one or more fluid film/squeeze-film dampers in bearing supports to provide viscous type damping and dissipation of the bowed rotor excitation energy as well as other sources of vibration. However, at low speeds where bowed rotor modes occur in the operating range, the dampers may not always be filled sufficiently with oil or fully pressurized so that the dampers may not be providing sufficient or optimal damping to counteract the bowed rotor response. Embodiments selectively modify a spring rate and a damping characteristic of one or more bearing supports in the gas turbine engine while a shaft of the gas turbine engine rotates below a speed which is adversely affected by a bowed rotor condition of the gas turbine engine. The speed which is adversely affected by a bowed rotor condition can be any speed below idle, such as a fundamental mode of the engine or a bowed rotor critical speed, for instance. In one example, the spring rate and damping characteristics of one or more bearing supports can be selectively modified using an auxiliary source of pressurized oil, for instance, stored in an accumulator. The accumulator is operable to provide high pressure oil to augment existing oil system capabilities to ensure the dampers are operating in an optimized state with oil at high pressure to provide maximum filling of the dampers and at a temperature which enhances the viscosity of the oil. As one example, the accumulator can store oil pressurized at about 300 pounds per square inch (psi) or about 2068.4 kilopascals (kPa). The accumulator can be filled during normal operation while the engine is operating at high speed where otherwise maximum oil pressure to the dampers is not needed. Release of the pressurized oil from the accumulator may be controlled by an engine control system to energize the damper when bowed rotor conditions are detected. Alternatively, pressurized oil may be released from the accumulator passively every time the engine is started.

Various embodiments of this disclosure may be applied on any turbomachinery component that requires damping at startup. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both. Oil pumps used to lubricate and dampen vibrations within a gas turbine engine may not provide sufficient oil pressure at startup and at low speeds, as the oil pumps are typically driven by rotation of the engine. Embodiments can selectively modify the spring rate and the damping characteristics of one or more bearing supports while a shaft of the gas turbine engine rotates through a resonant frequency of the shaft.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

FIG. 1 schematically illustrates a gas turbine engine 10 that can be used to power an aircraft, for example. The gas turbine engine 10 is disclosed herein as a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 10 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30 in the example of FIG. 1, thereby forming a geared turbofan engine. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

Although FIG. 1 depicts one example configuration, it will be understood that embodiments as described herein can cover a wide range of configurations. For example, embodiments may be implemented in a configuration that is described as a "straddle-mounted" starting spool. This configuration places two bearing compartments, e.g., bearing systems 38, outside of the plane of most of the compressor disks and at outside at least one of the turbine disks. In contrast with a straddle-mounted spool arrangement, other embodiments may be implemented using an over-hung mounted spool. In an over-hung mounted spool, a bearing compartment is located forward of the first turbine disk such that the turbine is overhung, and it is physically located aft of its main supporting structure. The use of straddle-mounted spools has advantages and disadvantages in the design of a gas turbine, but one characteristic of the straddle-mounted design is that the span between the bearing compartments is long, making the amplitude of the high spot of a bowed rotor greater. For any thrust rating, the straddle mounted arrangement gives Lsupport/Dhpt values that are higher, and the overhung mounted arrangement can be as much as 60% of the straddle-mounted Lsupport/Dhpt. Lsupport is the distance between bearings, and Dhpt is the diameter of the last blade of the high pressure turbine. As one example, a straddle-mounted engine starting spool with a roller bearing located aft of the high pressure turbine (HPT) may be more vulnerable to bowed rotor problems since the Lsupport/Dhpt ranges from 1.9 to 5.6.

Figure 2:
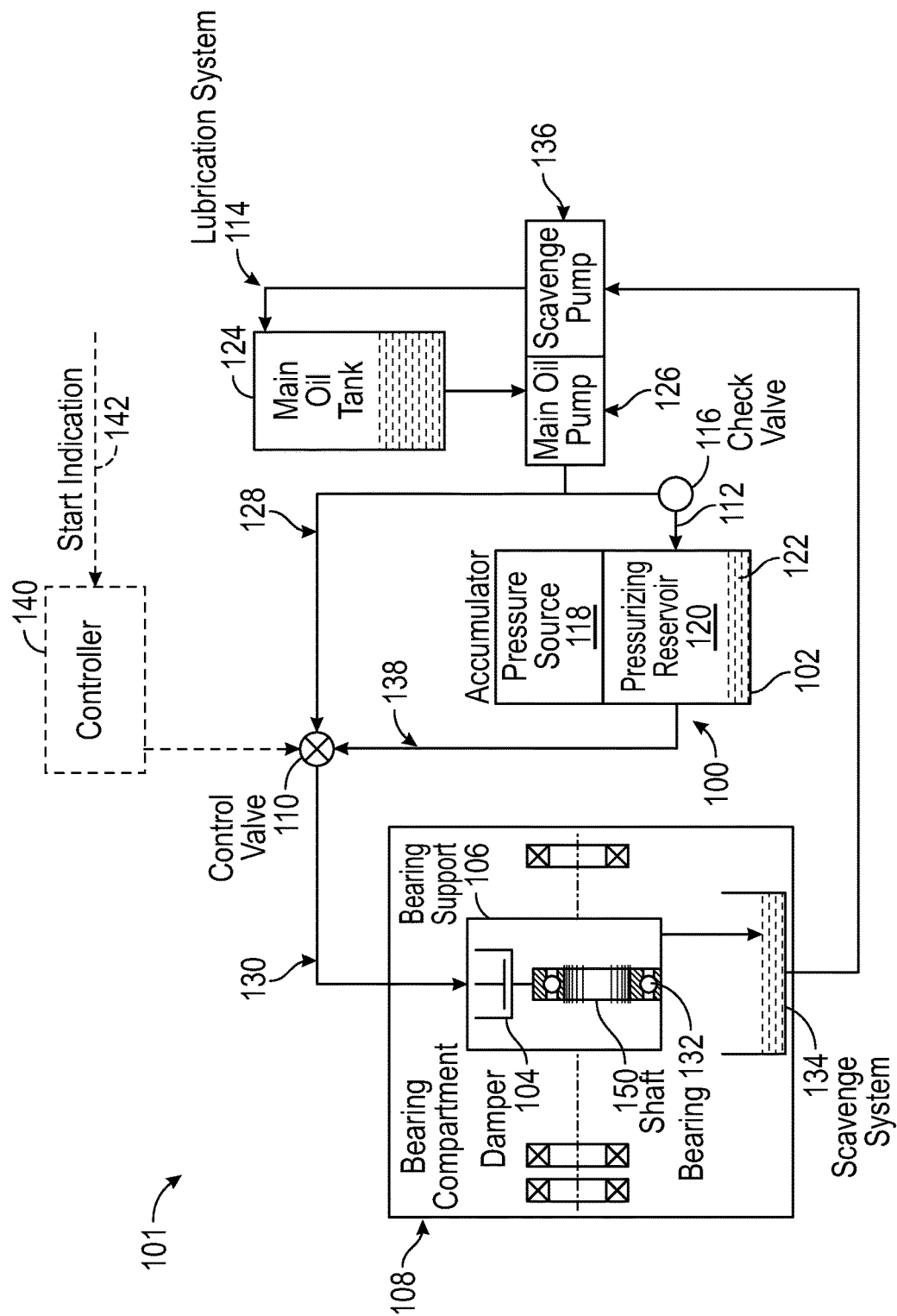
FIG. 2 is a block diagram of a bowed rotor start response damping system according to an embodiment of the disclosure.

FIG. 2 is a block diagram of the bowed rotor prevention system 100 in an oil supply circuit 101 of the gas turbine engine 10 of FIG. 1 according to an embodiment. In the example of FIG. 2, the bowed rotor prevention system 100 includes an accumulator 102 in fluid communication with one or more dampers 104 in a bearing support 106 of the gas turbine engine 10 of FIG. 1. Each damper 104 is a fluid film/squeeze-film damper that provides viscous type damping and dissipation of bowed rotor excitation energy upon an engine start condition. The bearing support 106 may be located in a bearing compartment 108 of one or more of the bearing systems 38 of FIG. 1. The bowed rotor prevention system 100 also includes a control valve 110 operable to release pressurized oil 122 from the accumulator 102 into one or more dampers 104 upon a start condition of the gas turbine engine 10 of FIG. 1. An oil supply interface 112 of the accumulator 102 is coupled to a lubrication system 114 of the gas turbine engine 10 of FIG. 1. The bowed rotor prevention system 100 can also include a check valve 116 interposed between the oil supply interface 112 and the lubrication system 114.

The accumulator 102 may be a pressurizing bottle or tank with a bladder or spring-loaded cartridge system providing a pressure source 118 to a pressurizing reservoir 120. The pressurizing reservoir 120 can have a variable volume that increases as pressurized oil 122 is added from the lubrication system 114. The check valve 116 allows filling of the pressurizing reservoir 120 at nominal power conditions of the gas turbine engine 10 of FIG. 1. The lubrication system 114 can be a main lubrication system of the gas turbine engine 10 of FIG. 1. The lubrication system 114 can include a main oil tank 124 which holds oil that is pumped by a main oil pump 126 to provide a main oil supply 128. The main oil pump 126 can be driven by the high speed spool 32 of FIG. 1.

According to an embodiment, the main oil pump 126 provides the main oil supply 128 to the bearing compartment 108 of the gas turbine engine 10 of FIG. 1 as a damping supply 130 to lubricate a plurality of bearings 132, such as journal bearings. Used/excess oil is captured in a gutter 134 and returned to the main oil tank 124 by a scavenge pump 136 in the example of FIG. 2. The bearings 132 can support rotation of a shaft 150, such as outer shaft 50 of FIG. 1, in combination with bearing support 106.

The control valve 110 controls whether oil supplied to one or more dampers 104 is from the main oil supply 128 or an accumulator oil path 138 output from the accumulator 102. In some embodiments, a controller 140 is operable to open the control valve 110 to urge the pressurized oil 122 from the accumulator 102 into one or more dampers 104 in response to detecting a start indication 142 of the gas turbine engine 10 of FIG. 1. The start indication 142 may be received from an engine control (not depicted), an aircraft communication bus, a sensor, and/or a discrete switch. The start indication 142 can be a general indication of a request to start the gas turbine engine 10 of FIG. 1 or a start with a bowed rotor condition detected. Alternatively, the controller 140 can be omitted, where a passive implementation opens the control valve 110 to establish a flow of the pressurized oil 122 from the accumulator 102 to the damper 104 upon a start and/or low oil pressure condition of the main oil supply 128. The controller 140 can close the control valve 110 based on a time value, an engine speed, a pressure reading, and/or the like. The controller 140 may be operable to control opening of the control valve 110 to selectively modify a spring rate and a damping characteristic of one or more bearing supports 106 in the gas turbine engine 10 while a shaft 150 (e.g., outer shaft 50) of the gas turbine engine 10 rotates below an idle speed, for instance, through a resonant frequency of the shaft 150.

The controller 140 may include memory to store instructions that are executed by a processor. The executable instructions may be stored or organized in any manner and at any level of abstraction, such as in connection with a controlling and/or monitoring operation of one or more systems of the gas turbine engine 10 of FIG. 1. The processor can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form. The controller 140 can be embodied in an individual line-replaceable unit, within a control system (e.g., in an electronic engine control), and/or distributed between multiple electronic systems.

Figure 3:
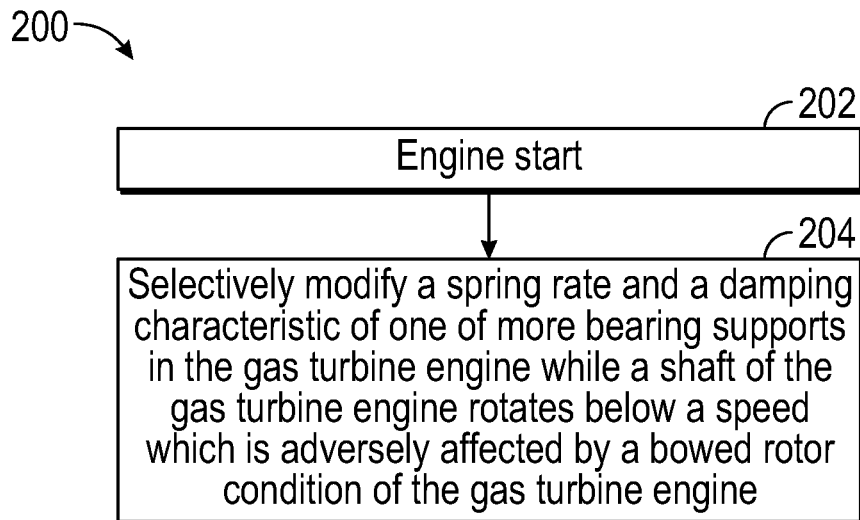
FIG. 3 is a process flow of a method according to an embodiment of the disclosure.

FIG. 3 is a process flow of a method 200 according to an embodiment. At block 202, the gas turbine engine 10 of FIG. 1 starts. A start indication can be detected by the controller 140 of FIG. 2 as a start request and/or by rotation of the shaft 150 of FIG. 2. At block 204, a spring rate and a damping characteristic of one or more bearing supports 106 of FIG. 2 are selectively modified in the gas turbine engine 10 of FIG. 1 while the shaft 150 of FIG. 2 rotates below a speed which is adversely affected by a bowed rotor condition of the gas turbine engine 10 of FIG. 1. As previously described, the speed which is adversely affected by a bowed rotor condition can be any speed below idle, such as a fundamental mode of the engine or a bowed rotor critical speed, for instance. The spring rate and damping characteristic modifications may be achieved using an auxiliary source of pressurized oil, such as the bowed rotor prevention system 100 of FIG. 2. A further example is provided in FIG. 4.

Figure 4:
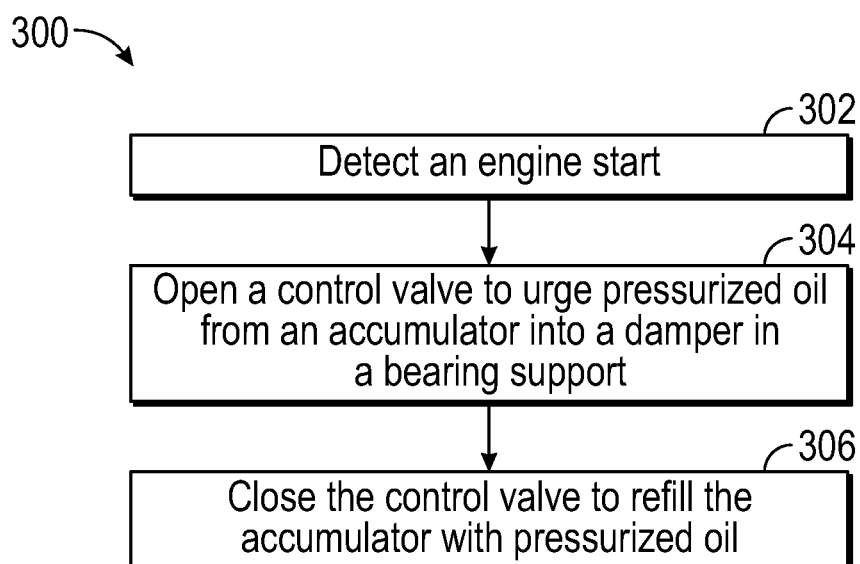
FIG. 4 is a process flow of a method according to an embodiment of the disclosure.

FIG. 4 is a process flow of a method 300 according to an embodiment. The method 300 of FIG. 4 is one example of the method 200 of FIG. 3 to selectively modify a spring rate and a damping characteristic of one or more bearing supports in a gas turbine engine while a shaft of the gas turbine engine rotates below a speed which is adversely affected by a bowed rotor condition of the gas turbine engine. The method 300 can be implemented by the controller 140 of the bowed rotor start response damping system 100 of FIG. 2, and thus FIG. 4 is described with reference to FIGS. 1-3. At block 302, the controller 140 detects an engine start condition as a start indication 142. The controller 140 can monitor sensor data and/or other data sources to determine that an engine start condition, which may include detection of a bowed rotor condition, exists for the gas turbine engine 10. At block 304, the controller 140 opens the control valve 110 to urge pressurized oil 122 from the accumulator 102 into at least one damper 104 of the bearing support 106 of the gas turbine engine 10 based on the start indication 142. An open state of the control valve 110 refers to selecting the accumulator oil path 138 to provide the damping supply 130 with oil rather than the main oil supply 128 providing oil to the damping supply 130. Block 304 can be performed while the gas turbine engine 10 rotates below an idle speed such that a spring rate and a damping characteristic of one or more bearing supports 106 increases damping at a resonant frequency of a shaft (e.g., outer shaft 50) before other sources of damping (e.g., main oil pump 126) provide a sufficient level of pressurized oil. At block 306, the controller 140 closes the control valve 110 to refill the accumulator 102 with pressurized oil 122. The controller 140 may determine when to close the control valve 110 such that the damping supply 130 is supplied by the main oil supply 128 based on a pressure reading, an engine speed, a time period elapsing or other threshold condition.

Technical effects and benefits include damping vibrations in a gas turbine engine at startup by using an accumulator to provide pressurized oil to dampers in bearing supports before sufficient oil pressure can be provided by an oil pump driven by the gas turbine engine.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of bowed rotor start response damping for a gas turbine engine, the method comprising:
   selectively modifying a spring rate and a damping characteristic of one or more bearing supports in the gas turbine engine by controlling a release of pressurized oil from an accumulator comprising a pressurizing reservoir having a variable volume while a shaft of the gas turbine engine rotates below a rotational speed which adversely affects the gas turbine engine during a bowed rotor condition of the gas turbine engine.

2. The method of claim 1, wherein selectively modifying the spring rate and the damping characteristic of the one or more bearing supports is performed while the shaft of the gas turbine engine rotates at a changing rotational speed that passes through a resonant frequency of the shaft.

3. The method of claim 1, wherein the gas turbine engine comprises a turbofan with a straddle mounted starting spool comprising at least one bearing located aft of at least one turbine disk of the gas turbine engine.

4. The method of claim 1, wherein the gas turbine engine comprises a turbofan.

5. The method of claim 1, wherein selectively modifying the spring rate and the damping characteristic of the one or more bearing supports is performed based on detecting a start indication of the gas turbine engine.

6. The method of claim 5, wherein selectively modifying the spring rate and the damping characteristic of the one or more bearing supports further comprises opening a control valve to urge pressurized oil into a damper of at least one of the one or more bearing supports based on the start indication.

7. The method of claim 6, further comprising selectively closing the control valve to accumulate the pressurized oil in the pressurizing reservoir.

8. A bowed rotor start response damping system for a gas turbine engine, the bowed rotor start response damping system comprising:
   an accumulator comprising a pressurizing reservoir having a variable volume; and
   an oil supply circuit configured to selectively modify a spring rate and a damping characteristic of one or more bearing supports in the gas turbine engine by controlling a release of pressurized oil from the accumulator while a shaft of the gas turbine engine rotates below a rotational speed which adversely affects the gas turbine engine during a bowed rotor condition of the gas turbine engine.

9. The bowed rotor start response damping system of claim 8, wherein selective modification of the spring rate and the damping characteristic of the one or more bearing supports is performed while the shaft of the gas turbine engine rotates at a changing rotational speed that passes through a resonant frequency of the shaft.

10. The bowed rotor start response damping system of claim 8, wherein the gas turbine engine comprises a turbofan with a straddle mounted starting spool comprising at least one bearing located aft of at least one turbine disk of the gas turbine engine.

11. The bowed rotor start response damping system of claim 8, wherein the gas turbine engine comprises a geared turbofan.

12. The bowed rotor start response damping system of claim 8, wherein selective modification of the spring rate and the damping characteristic of the one or more bearing supports are performed based on detecting a start indication of the gas turbine engine.

13. The bowed rotor start response damping system of claim 12, further comprising a control valve, wherein selective modification of the spring rate and the damping characteristic of the one or more bearing supports further comprises opening the control valve to urge pressurized oil into a damper of at least one of the one or more bearing supports based on the start indication.

14. The bowed rotor start response damping system of claim 13, wherein the control valve is selectively closed to accumulate the pressurized oil in the pressurizing reservoir.

15. A gas turbine engine comprising:
one or more bearing supports;
a shaft supported by one or more bearings of the one or more bearing supports;
an accumulator comprising a pressurizing reservoir having a variable volume; and
an oil supply circuit configured to selectively modify a spring rate and a damping characteristic of the one or more bearing supports by controlling a release of pressurized oil from the accumulator while the shaft rotates below a rotational speed which adversely affects the gas turbine engine during a bowed rotor condition of the gas turbine engine.

16. The gas turbine engine of claim 15, wherein selective modification of the spring rate and the damping characteristic of the one or more bearing supports is performed while the shaft of the gas turbine engine rotates at a changing rotational speed that passes through a resonant frequency of the shaft.

17. The gas turbine engine of claim 15, wherein the gas turbine engine comprises a turbofan with a straddle mounted starting spool comprising at least one bearing located aft of at least one turbine disk of the gas turbine engine.

18. The gas turbine engine of claim 15, wherein the gas turbine engine comprises a geared turbofan.

19. The gas turbine engine of claim 15, wherein selective modification of the spring rate and the damping characteristic of the one or more bearing supports are performed based on detecting a start indication of the gas turbine engine.

20. The gas turbine engine of claim 19, further comprising a control valve, wherein selective modification of the spring rate and the damping characteristic of the one or more bearing supports further comprises opening the control valve to urge pressurized oil into a damper of at least one of the one or more bearing supports based on the start indication, and the control valve is selectively closed to accumulate the pressurized oil in the pressurizing reservoir.

* * * * *